April 12, 1938.  S. E. ROWE  2,113,859
TRAP NEST
Filed Dec. 17, 1936
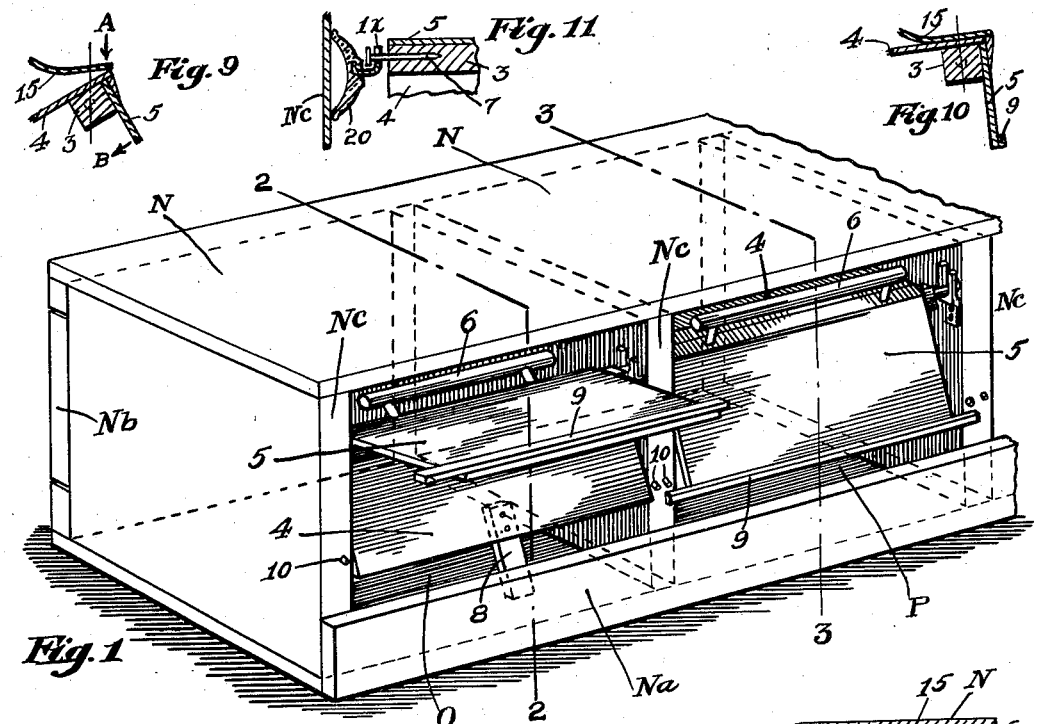
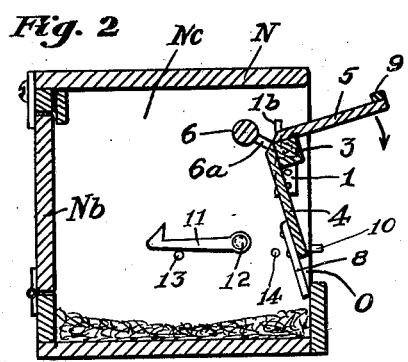
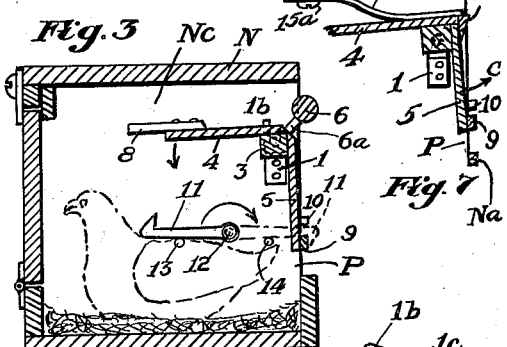
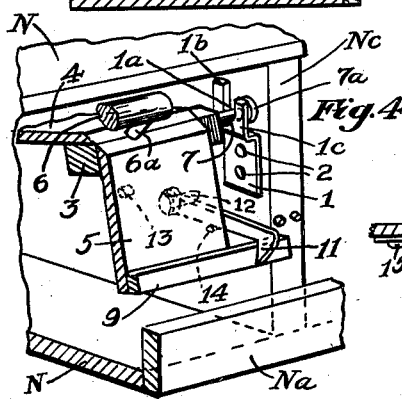
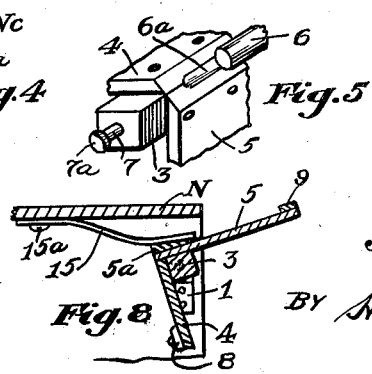
Inventor,
Seth E. Rowe.
By Henry L. Chenery.
Atty.

Patented Apr. 12, 1938

2,113,859

UNITED STATES PATENT OFFICE 2,113,859

TRAP NEST

Seth E. Rowe, New Gloucester, Maine

Application December 17, 1936, Serial No. 116,364

2 Claims. (Cl. 119—49)

My invention relates generally to devices employed on poultry farms or henneries where the production and marketing of eggs forms one of the principal duties of the poultry raiser.

It deals more particularly with an accessory for hens' nests and its object is, primarily, to prevent two hens from simultaneously occupying the same nest for laying their eggs.

While the apparatus is used chiefly for the foregoing purpose it is also adapted for use as a trap nest, and for this reason I have herein designated it as such.

Poultry raisers who make a specialty of marketing hens' eggs suffer a quite considerable loss at times by the breakage of eggs while in the nests. This comes about by reason of the fact that a hen has the propensity for forcing herself into a nest already occupied by another hen, and as the ordinary nest is usually somewhat restricted in size the scramble between the two hens for possession of it nearly always results in their treading on the eggs, with their consequent breakage.

In the present invention I have evolved structure which will permit one hen while entering the nest to automatically set the apparatus into condition to prevent another hen entering until the first hen has laid her egg and has left the nest.

The first hen, when leaving the nest, re-positions the parts so as to permit the second hen, awaiting a chance to enter, to do so.

The details of construction and method of operating the device will hereinafter be set forth; and for the purpose of illustratively disclosing the features of my invention I have supplied the accompanying drawing in which like reference characters are employed to identify like parts in all the different views thereof.

In the drawing,—

Fig. 1 is a perspective view of two nests, each equipped with my apparatus, the first is ready for a hen to enter, the second one shows the device as it is positioned after the hen has entered the nest;

Fig. 2 is a section on broken line 2—2, Fig. 1;

Fig. 3 is a section on broken line 3—3, Fig. 1;

Fig. 4 is a fragmentary perspective view, partly in section, of the apparatus when used as a trap nest;

Fig. 5 is a fragmentary perspective view of the device, detached from the nest;

Fig. 6 is a perspective view of one of the supporting brackets;

Figs. 7 and 8 show an alternative arrangement for automatically completing the last portion of the rotary movement of the axle, in either direction, the same being a substitute for the counter-weight method shown in Figs. 1, 2 and 3;

Figs. 9 and 10 are details having to do with the construction shown in Figs. 7 and 8, and Fig. 11 shows an alternative structure for the brackets on which the axle ends are supported.

Referring to the drawing, N represents a hen's nest, made in this instance as a part of a line of nests, as is the conventional method of constructing this class of devices.

The front of each nest is open except for a short height base board Na. The back is provided with doors Nb hinged to swing open when collection of eggs is to be undertaken.

In marketing my product I can, of course, supply the nests fully equipped with my apparatus, but as these nests are generally of standard dimensions and the poultry raiser already is supplied with them, I prefer to market the equipment only, the poultry raiser installing the apparatus in his own nests.

On each of the opposite sides, interiorly of the nest and disposed near its front, open end is a supporting bracket 1 for the trap door. The upper, offset portion of the bracket has a slot 1a, the rearward leg 1b of which is higher than the forward leg 1c to facilitate assembling the trap door in the apparatus. Holes 1d provide means for securing the brackets to the side walls of the nest, by nails or screws 2.

The trap door may be constructed in various ways and made of different kinds of material, but as shown, comprises a wooden square shape axle 3 on two sides of which are secured the wings 4 and 5, respectively.

At the point of juncture of the two wings is attached a counter-weight element 6 which preferably is made of a heavy material, such as iron or lead. Posts 6a secure it to the axle.

It will be observed that the counter-weight is disposed on a line drawn diagonally through opposite corners of the axle and dividing the angle between the two wings equally. Thus when the trap door is swung in either direction, as shown, respectively, in Figs. 2 and 3, the weight in each case overhangs or extends outwardly beyond the vertical line cutting the axis of the axle, and tends to swing the trap door in a direction in which the weight would drop were there no limitation to its rotation.

On each end of the axle is a headed pintle 7, the pintle itself lying in the crotch of the slot 1a with its head 7a disposed between the offset portion of the bracket and the wall Nc of the nest. The pintle construction is the same on both ends of the axle, but the brackets must be made right and left hand, respectively, due to the fact that in the bifurcated offset portion one leg is longer than the other.

Secured on the bottom portion of the wing 4 is a stop-arm 8, which, when the trap-door is positioned to admit a hen to the nests, abuts on the base board Na and limits the rotary movement of the trap-door in one direction, this position of the parts being shown in Fig. 2, and also in the first nest illustrated in Fig. 1.

Now the hen, of course, cannot fully enter the nest through the restricted opening O, but seeing the straw S in the nest she will first put her head into the opening and finding that the door gives way to her, she will continue the attempt to gain full entrance, particularly as the opening increases in size as she proceeds, and is finally fully within the enclosure.

But by this time she (the hen) has raised the wing 4 beyond the equilibrium or balancing point and through the agency of the counter-weight 6 the trap door, of itself, will continue to swing until it assumes the position shown in Fig. 3, and also in the second nest shown in Fig. 1.

Should a hen outside the nest attempt to enter it when the trap-door is positioned as shown in Fig. 3, the cross-rail 9, abutting on the edges of the walls or partitions Nc will bar and prevent inward movement of the wing 5 and nullify the hen's attempt to gain access to the nest at this time. Should the hen enter her head in the opening P and start to lift the trap-door, it will rise no further than to bring the cross-rail into engagement with the stop-pins 10, stalling any attempt to enter the nest when the trap-door is thus disposed.

Some nests are made of steel, in which case the bracket 1x may be bolted, riveted or electric welded to partitions Nc. Or as an alternative, a suction cup 20 with the bracket 1x molded therein might be employed, this being shown in Fig. 11.

With the foregoing elements operating, two hens cannot easily occupy the same nest at the same time, and breakage of eggs, by the confusion arising from the persistent effort of each hen to gain possession of the nest is eliminated. But the apparatus has another function which it is called upon to exercise very frequently.

Poultry raisers are ever on the alert to segregate their hens to ascertain which are the best "layers", considering quantity, size, and shape of the eggs produced by each hen as giving her a certain listing, or comparative value with the rest of the flock. To know just which hens "lay" the largest eggs, for instance, is valuable information, for the progeny of those members of his poultry flock are apt to also produce likewise. So it is an object of this device to easily convert the apparatus, a description of which has just been set forth, into what to all intents and purposes is a trap-nest, designed to confine the hen in the nest once she has entered it.

To this end I provide a locking-hook 11, pivotally secured to the side of one of the walls or partitions Nc, by a nail or screw 12, with a stop-pin 13 to hold the hook conveniently disposed when out of action, and a stop-pin 14 to locate the end of the locking-hook so that it will be readily engaged by the cross-rail 9 when the wing 5 swings down into position shown in Fig. 3. The hen entered the nest as she did with the parts operating as previously described, but in this present instance she is locked in until an investigation can be made as to the result of her occupation of the nest. In other words, this particular hen can be identified and listed in accordance with what she has produced.

While I believe that the apparatus, a description of which has just been set forth and a substantially correct embodiment thereof depicted in Figs. 2 and 3 of the drawing, is preferred construction, I may, nevertheless, elect to depart somewhat from the hereinbefore described method of acquiring automatic contra-balancing of the trap-door as it approaches the end of its rotative movement in either direction.

To this end I substitute for the dead-weight element 6 a yieldable-pressure element 15, this element being in the form of a spring secured to the under side of the top of the nest N, by any suitable means, as for instance by screws or nails 15a.

The flat, free end of this spring has somewhat broad contact with each wing of the trap-door as the hen swings it alternately in opposite directions; and as the trap-door approaches the end of its swinging movement, in either direction, the spring functions to complete the rotative movement of the door.

A clearer understanding of the action of the spring 15 may be had by examination of Figs. 9 and 10. Fig. 9, in which the trap-door is shown as it is nearing the position shown in Fig. 7, depicts the spring exerting a pressure on the upper, outside corner of the trap-door, to the right of the pivotal point 7 thereof. This pressure applied in the direction indicated by the arrow A causes this side of the trap-door to be depressed and the wing 5 to be swung in the direction of the arrow B, bringing the parts into the positions they assume in Fig. 10, or as more completely shown in Fig. 7.

When the hen is ready to leave the nest she first puts her head into the opening P, and continuing her movements to vacate the box, swings the wing 5 outwardly and upwardly until it arrives at a point at which the spring 15 acts on it, contrariwise to the action shown in Fig. 9, resulting in re-positioning the trap-door as illustrated in Fig. 8.

It will be noted by reference to Figs. 7 and 8 that, as shown, the wings 4 and 5 do not stand at uniform angles with respect to horizontal and vertical positions, that is to say, when the door 4 is positioned to close the opening P it stands at a different angle from vertical than does the door 5 when swung down into relatively the same position. Thus it is necessary to change the angle of presentment of the spring 15 to the wing 5 by inserting a small wedge shape piece 5a between the spring and face of the wing.

In summation, the movement of the trap-door is largely accomplished by the hen herself, the spring 15 in one instance and the weight 6 in the other simply finishing the swinging of the trap-door and holding it lightly abutting the stop elements as hereinbefore described.

The ability of the apparatus to either eliminate or greatly reduce the breakage of eggs is a prime object of the invention. But its capacity for segregating the flock as each individual hen is confined in the nest constitutes another advantage which raisers of fancy stock will greatly appreciate, as this function of the device permits the pedigree of each hen to be accurately appraised.

The apparatus has been put to practical operation and has proven itself to be a very efficient and satisfactorily working accessory to the poultry raiser's equipment.

What I claim is:

1. A trap nest apparatus comprising in combination with a box having a relatively low base board beneath the opening in its front side, an axle within said box, a pintle on each end of said axle, a bracket secured on each side, interiorly, of said box, said bracket having an upstanding, bifurcated off-set portion forming two legs, the inwardly disposed leg being higher than the outwardly disposed one, two wings secured at their inner ends to said axle, said wings being disposed, relatively, at substantially a right angle, a stop arm on one of said wings adapted to engage said base board to restrict the rotary movement of said axle in one direction, a cross-rail on the other of said wings serving as a stop by engaging the sides of said box to limit the rotary movement of said axle in the opposite direction, and means to automatically rotate said axle when it has, by other means, completed substantially three quarters of its swinging movement and one of the said wings is approaching the position in which it is stopped by its associated stop element.

2. A trap nest apparatus having characteristics according to claim 1, and in addition, a locking-hook pivotally secured on the side of said box and adapted to swing outwardly, and a pin upon which said locking-hook rests for positioning to be engaged by said cross-rail when the wing on which it is mounted is swung downwardly, said locking hook making automatic engagement with said cross-rail and susceptible of being manually disengaged therefrom.

SETH E. ROWE.